Figure 1:
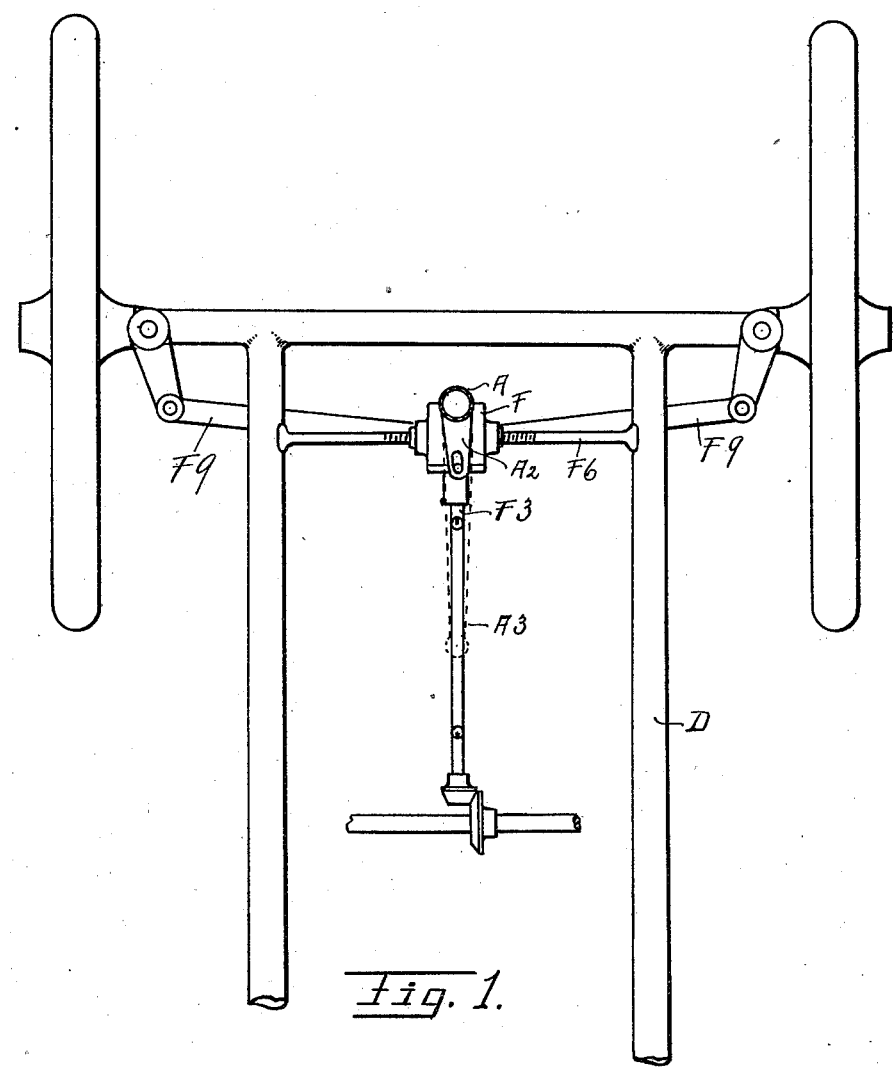

No. 668,218. Patented Feb. 19, 1901.
G. L. ROBY.
MOTOR VEHICLE.
(Application filed July 7, 1900.)
(No Model.) 2 Sheets—Sheet 1.

Witnesses
L. F. Roby
A. R. Mabey

Inventor
Geo. L. Roby

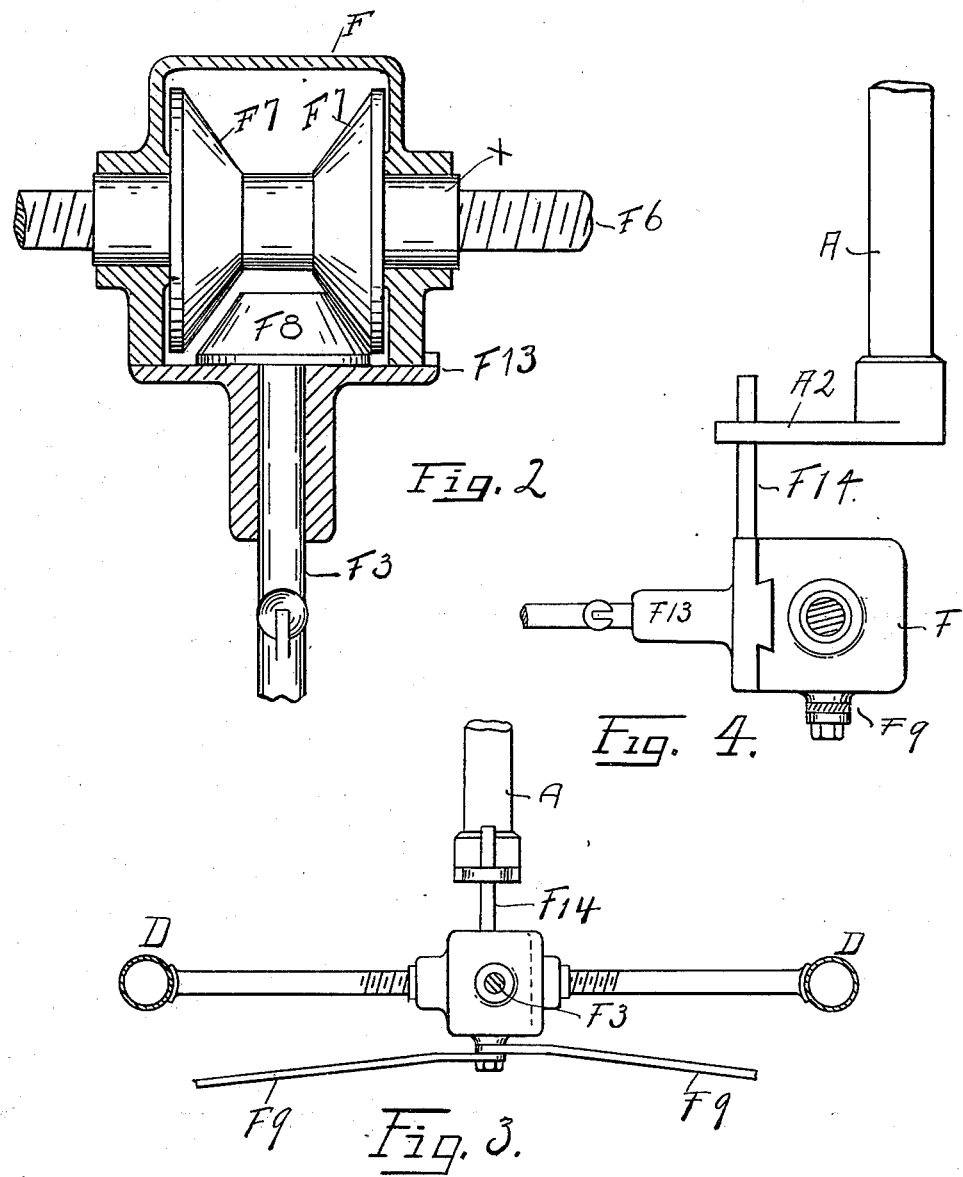

UNITED STATES PATENT OFFICE.

GEORGE L. ROBY, OF DAYTON, OHIO.

MOTOR-VEHICLE.

SPECIFICATION forming part of Letters Patent No. 668,218, dated February 19, 1901.

Application filed July 7, 1900. Serial No. 22,833. (No model.)

*To all whom it may concern:*

Be it known that I, GEORGE L. ROBY, a citizen of the United States, residing at Dayton, in the county of Montgomery and State of Ohio, have invented certain new and useful Improvements in Motor-Vehicles, of which the following is a full and clear description.

The object of my invention is to provide means by which the power ordinarily used to propel the vehicle may be used also to guide it in a safe and convenient manner.

Figure 1 is a plan view of the guiding-wheels, frame, and guiding mechanism; Fig. 2, a sectional view of the yoke surrounding the rotatable nut; Fig. 3, an end elevation of the fixed screw or guideway and yoke; Fig. 4, an end section of the same parts.

The same letters refer to the same parts throughout the different views.

$F^7 F^7$ are two bevel or angular faced wheels, mounted upon a sleeve or formed integral therewith, which are journaled in the yoke F. The interior of this sleeve is also threaded to fit the shaft $F^6$ and freely rotates thereon. The yoke F, being formed, preferably, so as to incase these parts, also abuts against the sleeve, so that its movement may easily be transferred to the guiding-wheels. To one side of this yoke F, I preferably attach in suitable slideways a boss or journal-bearing $F^{13}$, and on a short section of shafting turning therein I attach the gear $F^8$ on one end and the other end to the shaft $F^3$ by a universal joint, or to any flexible shafting. In the end view, Fig. 4, is to be seen more clearly this arrangement and also one way of attaching the crank upon the lower end of the guiding-post A to this independent part, though other means may well be used for doing so, the post A extending up so as to have a convenient master-lever controlling it within easy reach of the operator, but so arranged that it, the crank $A^2$, and gear $F^8$ must move in practical unison. The whole mechanism being mounted upon a screw or shaft $F^6$, preferably lying transversely to the line of travel of the vehicle, is connected to the stub-axles, pivoted at each end of the front or rear master-axle, as desirable, by pitmen in the usual manner.

The friction-gear $F^8$ is of course moved independent of the yoke F and threaded sleeve $F^7 F^7$ and is rotated by the same force propelling the vehicle, either by connection to some part of the vehicle rotating with its forward movement or with the motor rotating independent thereof.

Preferably the wheel $F^8$ does not revolve, except when by coming into contact with the angular surface of $F^7 F^7$ it is forced endwise into engagement with its primary driver, which is connected to the motive force of the vehicle, as just described; but so far as the object of my invention is concerned it is immaterial whether the wheel $F^8$ rotates continuously or intermittently when it comes into contact with the wheels $F^7 F^7$, as suggested. It will be evident that as the yoke F cannot move endwise only when the threaded sleeve to which $F^7 F^7$ is attached does so, and that the rotating gear $F^8$ by its connection to the crank $A^2$ may be brought against these wheels with considerable force, which will by the laws of friction, if of suitable material, also cause them to revolve and consequently move endwise, carrying with it the yoke and varying the relation of the guiding-wheels to the former angle at which they were moving by the connection thereto, as described.

It is evident that if the wheel $F^8$ were rotating to the right or clockwise and the shaft $F^6$ threaded, so that when the sleeve $F^7$ is rotated clockwise it would move away from the wheel $F^8$, the operator would be obliged to continue to move the crank $A^2$ in order to keep up sufficient pressure to cause the sleeve $F^7$ to rotate, and that if the pressure were reversed from the right to the left hand flange the yoke will be forced in the opposite direction, and, further, that if the distance between the flanges is but slightly wider than the diameter of the wheel $F^8$ the position of the crank $A^2$ and its master-lever must practically indicate the position of the yoke F and the angle of the guiding-wheels.

While I refer to the movement of the yoke upon its track or guideway generally as being "transverse" to the line of vehicle "travel," I do so only in a figurative sense and as the most common arrangement. It is, however, evident that when proper gears or equalizing-levers are introduced the movement and guideway may lie in any direction without affecting my invention.

Having described my invention, what I claim as new, and desire to protect by Letters Patent, is—

1. In a motor-vehicle guiding mechanism, the combination of an upright member journaled to the vehicle; a master-lever within reach of the operator controlling the position of such member, and a crank projecting from its lower end, to which is connected by suitable means a rotating gear, movable in an independent guideway, a track transverse to the line of vehicle travel, a case traveling on such track and movable thereon only by bringing the rotating gear controlled by the master-lever into contact with frictional gear mounted therein, thereby simultaneously moving the case and indicating its position substantially as described.

2. In a motor-vehicle guiding device, the combination of a guideway, a gear system traveling thereon connected to the steering-axles of the vehicle, and its position both moved and indicated by a master-lever pressing a motor-driven wheel into contact with frictional gearing mounted within the case, substantially as described.

3. In a motor-vehicle guiding device, the combination of a threaded shaft fixed to the frame, a threaded sleeve mounted thereon having friction-gears attached thereto, and the whole surrounded by a yoke or case connected to the axle, with a rotating gear driven by the vehicle motive power, and controlled by a lever by which it can be brought into contact with different friction-gears, and the position of the yoke simultaneously moved and indicated.

4. In a motor-vehicle guiding device, the combination of a nut traveling transversely to the line of vehicle travel, a yoke surrounding such nut and connected by suitable means to the steering-axle, with an upright shaft or post journaled to the vehicle, on whose lower end there is a crank connected to a driving mechanism operated by the motor, and on whose upper end there is a lever capable of simultaneously bringing such driving mechanism into contact with the traveling nut, and indicating its position, substantially as described.

5. In a motor-vehicle guiding mechanism, the combination of a threaded shaft, a nut traveling thereon, a yoke surrounding the nut and connected by suitable means to the vehicle-axle; a guideway on said yoke and a rotating gear whose journal is movable in a guideway, independent of the movement of the yoke, whereby the rotating gear may be moved in relation to the yoke, and come into contact with different parts of the nut, whereby its position may be simultaneously moved and indicated by the master guiding-lever, substantially as described.

In testimony whereof I have affixed my hand and seal in the presence of two witnesses.

GEORGE L. ROBY. [L. S.]

Witnesses:
E. J. FINKE,
L. F. ROBY.